(12) United States Patent
Joo

(10) Patent No.: US 7,986,655 B2
(45) Date of Patent: Jul. 26, 2011

(54) METHOD FOR SETTING UP A LINK BETWEEN BLUETOOTH DEVICES IN A BLUETOOTH SYSTEM

(75) Inventor: Young-Seoung Joo, Seoul (KR)

(73) Assignee: Samsung Electronics Co., Ltd (KR)

( * ) Notice: Subject to any disclaimer, the term of this patent is extended or adjusted under 35 U.S.C. 154(b) by 2695 days.

(21) Appl. No.: 10/157,616

(22) Filed: May 29, 2002

(65) Prior Publication Data

US 2003/0012219 A1 Jan. 16, 2003

(30) Foreign Application Priority Data

Jul. 12, 2001 (KR) .................................. 2001-41948

(51) Int. Cl.
*H04W 4/00* (2009.01)
(52) U.S. Cl. ....................................................... 370/328
(58) Field of Classification Search ........................ None
See application file for complete search history.

(56) References Cited

U.S. PATENT DOCUMENTS

| 6,405,027 | B1 * | 6/2002 | Bell ............................. 455/403 |
| 6,751,200 | B1 * | 6/2004 | Larsson et al. ................ 370/255 |
| 2002/0044549 | A1 * | 4/2002 | Johansson et al. ............ 370/386 |
| 2002/0045424 | A1 * | 4/2002 | Lee ................................ 455/41 |
| 2002/0068600 | A1 * | 6/2002 | Chihara et al. ................ 455/550 |
| 2003/0036350 | A1 * | 2/2003 | Jonsson et al. ................. 455/41 |
| 2004/0261112 | A1 * | 12/2004 | Hicks et al. .................... 725/89 |

* cited by examiner

*Primary Examiner* — Raj K Jain
(74) *Attorney, Agent, or Firm* — The Farrell Law Firm, P.C.

(57) ABSTRACT

A method for connecting, by a first Bluetooth device of a first piconet, a link between a second Bluetooth device of a second piconet and a third Bluetooth device of a third piconet that cannot directly communicate with each other. The connecting method comprises the steps of: upon receiving a connection request message from the second Bluetooth device requesting connection with the third Bluetooth device, transmitting the connection request message from the first Bluetooth device to the third Bluetooth device; and upon receiving a response to the connection request message from the third Bluetooth device, transmitting the response from the first Bluetooth device to the second Bluetooth device.

6 Claims, 4 Drawing Sheets

METHOD FOR SETTING UP A LINK BETWEEN BLUETOOTH DEVICES IN A BLUETOOTH SYSTEM

PRIORITY

This application claims priority to an application entitled "Method for Setting up a Link between Bluetooth Devices in a Bluetooth System" filed in the Korean Industrial Property Office on Jul. 12, 2001 and assigned Serial No. 2001-41948, the contents of which are hereby incorporated by reference.

BACKGROUND OF THE INVENTION

1. Field of the Invention

The present invention relates generally to a Bluetooth system, and in particular, to a method for setting up a communication link between Bluetooth devices in a Bluetooth system.

2. Description of the Related Art

The Bluetooth standard has been introduced to provide low-cost, short-range wireless communication between mobile devices such as a portable PC (Personal Computer) and a mobile phone. The Bluetooth standard enables wireless voice/data communication between various digital devices, using a radio frequency. For example, a mobile phone and a notebook computer (a portable PC), when employing the Bluetooth technology, can be wirelessly connected to each other without using a cable. The Bluetooth technology is applicable to all kinds of digital devices, including a PDA (Personal Digital Assistant), a desktop computer, a FAX (facsimile), a keyboard and a joystick.

FIG. 1 illustrates a network structure of a conventional Bluetooth system. As illustrated in FIG. 1, the Bluetooth system supports point-to-point and point-to-multipoint connections. Devices sharing one channel should also share a channel capacity, and a set of these devices is called a "piconet". That is, the piconet is defined as a set of devices connected to one another through a Bluetooth ad-hoc network. In general, one piconet includes 7 devices: one of the 7 devices serves as a master for performing piconet management operations such as the generation of a frequency hopping pattern, while the remaining devices serve as slaves.

Hereinafter, reference will be made to a piconet forming process. In a standby state where devices are disconnected from one another, each device receives a new message every 1.28 second. When a device receives a connection request message from other devices, the device serves as a master and starts to identify other devices by exchanging Inquiry and Page messages. At this point, the devices assigned an 8-bit park address enter into a park state. The devices in communication with the master are then assigned a 3-bit active address to get into an active state, which results in the formation of a piconet. Since one of 8 ($=2^3$) addresses is used as a broadcasting address, 7 devices assigned the remaining 7 addresses constitute one piconet.

The active state is subdivided into three modes: an active mode, a hold mode and a sniff mode. In the active mode, the devices actually communicate with one another. In the hold and sniff modes, the devices participate in a piconet but do not influence the whole traffic of the piconet. The master transmits an Inquiry message including an access key at 625 μs intervals, and is synchronized with a slave within 2 seconds.

Upon receiving a Page message from the master after being assigned a 3-bit active address, the slave is synchronized with the master through a hopping pattern determined by the master. The master and the slave then perform an authentication process on each other. A password key used for the authentication is obtained by XOR-gating a random number generated by the master and an MAC (Medium Access Control) address of the slave. When the authentication process is completed, data can be communicated between the master and the slave. The master controls all of the traffic on a channel.

A scatternet is comprised of a plurality of independent, non-synchronized piconets. Users of each piconet have a unique 1 MHz hop channel in the scatternet. Since the users of the piconet do not share their unique 1 MHz channels with the users of other piconets, the total throughput increases with the number of the piconets. In addition, while a device serves as a slave in one piconet of the scatternet, the device can also serve as a master in another piconet.

However, referring to FIG. 1, the conventional Bluetooth system does not provide a function for linking a master 1 in a piconet A to a Bluetooth device in a piconet C. As a result, the master 1 cannot communicate with the devices in piconet C. Therefore, the conventional Bluetooth system has a flaw in that a Bluetooth device can only communicate with other Bluetooth devices in its piconet area, and cannot communicate with the Bluetooth devices in another piconet area.

SUMMARY OF THE INVENTION

It is, therefore, an object of the present invention to provide a method for connecting, by a first Bluetooth device, a communication link between a second Bluetooth device and a third Bluetooth device that cannot directly communicate with each other.

To achieve the above and other objects, there is provided a method for connecting, by a first Bluetooth device in a first piconet, a link between a second Bluetooth device in a second piconet and a third Bluetooth device in a third piconet that cannot directly communicate with each other. The connecting method comprises the steps of: upon receiving a connection request message from the second Bluetooth device requesting connection with the third Bluetooth device, transmitting the connection request message from the first Bluetooth device to the third Bluetooth device; and upon receiving a response to the connection request message from the third Bluetooth device, transmitting the response from the first Bluetooth device to the second Bluetooth device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
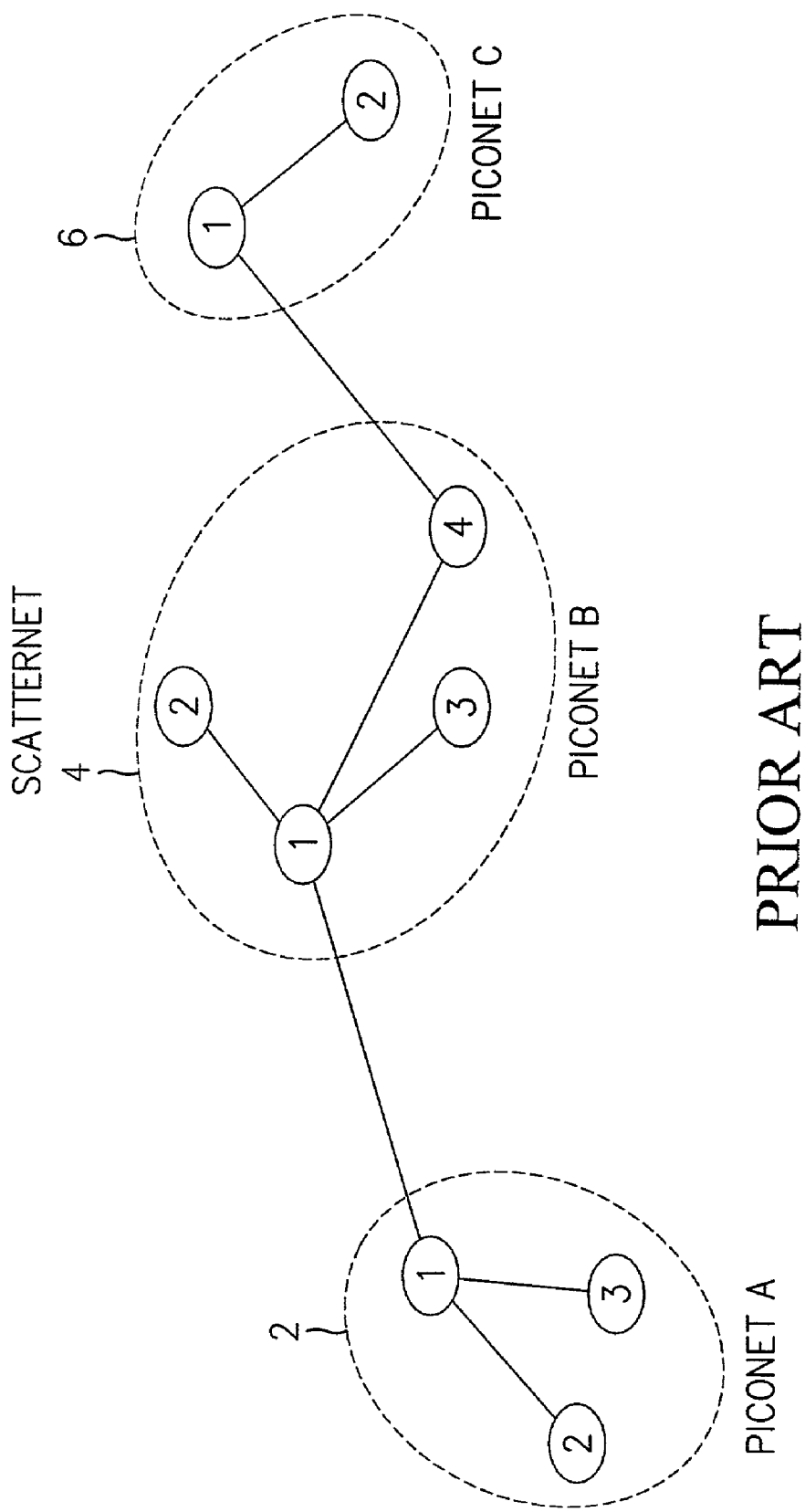
FIG. 1 is a diagram showing a network structure of a conventional Bluetooth system.
Figure 2:
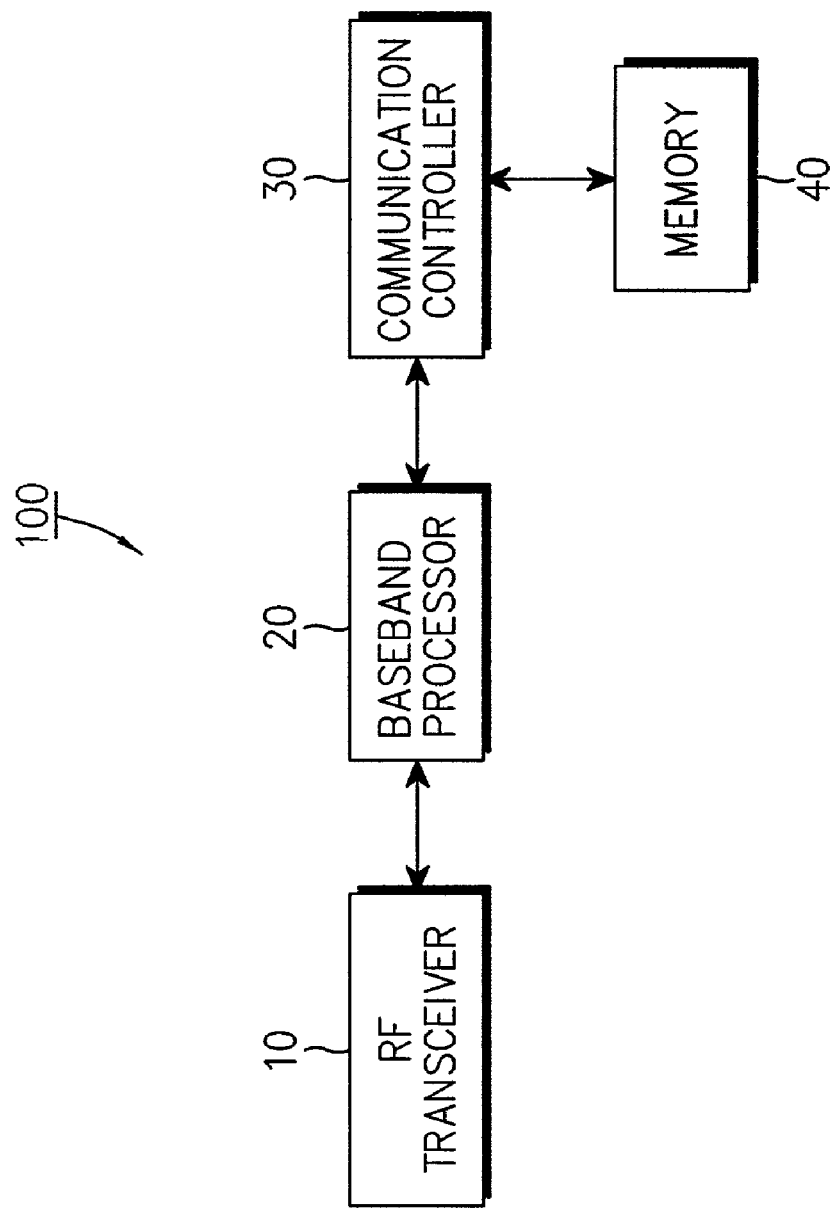
FIG. 2 is a block diagram of a Bluetooth communication device according to an embodiment of the present invention.

FIG. 2 illustrates a structure of a Bluetooth communication device according to an embodiment of the present invention. Referring to FIG. 2, a Bluetooth communication device 100 comprises an RF (Radio Frequency) transceiver 10, a baseband processor 20, a communication controller 30 and a memory 40.

During transmission, the RF transceiver 10 modulates a transmission data packet received from the baseband processor 20 into an RF signal, and amplifies the modulated RF signal prior to transmission. On the contrary, during reception, the RF transceiver 10 low-noise-amplifies a received RF signal, demodulates the amplified RF signal into a baseband signal and provides the demodulated baseband signal to the baseband processor 20. The baseband processor 20 generates a packet signal by adding an access code and a header to an HCI (Host Control Interface) data packet received from the communication controller 30, converts the packet signal into a data packet for wireless transmission, and provides the data packet to the RF transceiver 10. Conversely, the baseband processor 20 converts a data packet received through the RF transceiver 10 into an HCI packet and provides the HCI packet to the communication controller 30.

The communication controller 30 controls overall operation of the Bluetooth communication device 100. Upon receipt of an inquiry response message (or an inquiry response data packet) from a slave through the baseband processor 20, the communication controller 30 sets up a Bluetooth link to the slave. The communication controller 30 links Bluetooth devices that cannot directly communicate with each other. The communication controller 30 recognizes IP addresses of peripheral Bluetooth devices through an inquiry function of a Bluetooth device, a basic function for searching a peripheral Bluetooth device. The communication controller 30 stores the IP addresses of the peripheral Bluetooth devices in the memory 40 and, upon receiving an Inquiry message from an inquiring Bluetooth device, the communication controller 30 provides the inquiring Bluetooth device with an inquiry response data packet including information on an inquired peripheral Bluetooth device. Subsequently, when the inquiring Bluetooth device transmits a message indicating that it desires to communicate with the inquired Bluetooth device to the communication controller 30, the communication controller 30 transmits its own Bluetooth address, clock information, and a connection permission message to the inquiring Bluetooth device. In this manner, a Bluetooth device communicates with another Bluetooth device, which is located out of its coverage area. The memory 40 stores a program for controlling an operation of the communication controller 30, and also stores IP addresses of peripheral Bluetooth devices according to the present invention. The Bluetooth device through the inquiry process stated above obtains these IP addresses.

Figure 3:
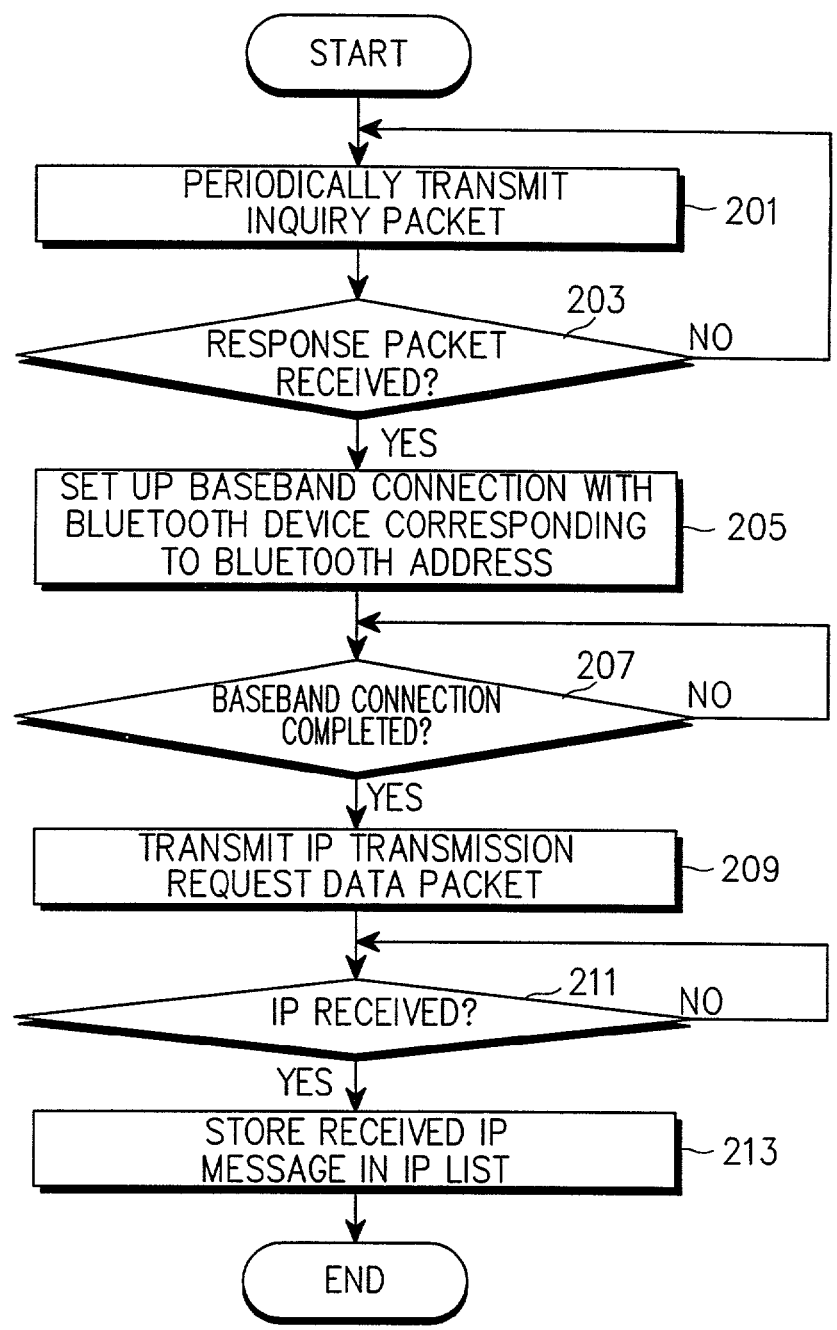
FIG. 3 is a flow chart illustrating a control procedure for acquiring, by the Bluetooth communication device, an IP (Internet Protocol) list of peripheral Bluetooth devices, according to an embodiment of the present invention.

FIG. 3 is a flow chart illustrating a control procedure for acquiring, by the Bluetooth communication device, an IP list of peripheral Bluetooth devices, according to an embodiment of the present invention. Referring to FIG. 3, as an inquiry process begins in a standby state, the communication controller 30 of the Bluetooth device 100 first controls the baseband processor 20 to periodically transmit an inquiry packet through the RF transceiver 10 at regular intervals in step 201. The communication controller 30 then awaits a response from the other Bluetooth device through the RF transceiver 10. When an inquiry period is set up, the inquiry process is performed at each inquiry time set by an internal counter of the Bluetooth communication device 100. Otherwise, when the inquiry period is not set up, the Bluetooth communication device 100 performs the inquiry process each time the communication controller 30 gives an inquiry command. In the meantime, the communication controller 30 can set a period of the inquiry process by registering a given value (e.g., 30 seconds or 1 minute) in a register of the baseband processor 20. In order to transmit a large number of inquiry packets in a short amount of time, thereby searching for other Bluetooth devices rapidly, the Bluetooth communication device 100 performs a transmission/reception operation in the inquiry process mode at a faster rate than in a normal Bluetooth operation mode. For example, if a transmission/reception rate in a normal connection mode is 1600 hops/s, a transmission/reception operation in the inquiry process mode is performed at a rate of 3200 hops/s. In this manner, the Bluetooth communication device 100 collects information about all the peripheral Bluetooth devices.

Upon receipt of inquiry response packets from peripheral Bluetooth devices through the RF transceiver 10 in the inquiry process in step 203, the communication controller 30 collects clock information and Bluetooth addresses of the peripheral Bluetooth devices and then proceeds to step 205. Otherwise, upon failure to receive the inquiry response packets in step 203, the communication controller 30 returns to step 201.

In step 205, the communication controller 30 performs a paging operation to set up a baseband connection with the peripheral Bluetooth device corresponding to the Bluetooth address. The paging operation is initiated when the communication controller 30 instructs the baseband processor 20 to set up a baseband connection with a slave Bluetooth device corresponding to the Bluetooth address to thereby set a register value of the baseband processor 20. Upon completion of the paging operation, the communication controller 30 transmits a connection proposal packet for proposing connection to the slave Bluetooth device. If the slave Bluetooth device accepts the connection proposal, baseband connection between the Bluetooth communication device 100 and the slave Bluetooth device is set up.

If there is a plurality of slave Bluetooth devices desiring to set up a baseband connection, the aforesaid process is performed on each slave Bluetooth device. In this case, a slave Bluetooth device that has completed a baseband connection set up, maintains a hold state until baseband connections with other slave Bluetooth devices are completely set up. If a baseband connection with the slave Bluetooth devices is completely set up in step 207, the communication controller 30 proceeds to step 209. In step 209, the communication controller 30 wirelessly transmits an IP message transmission request data packet to the slave Bluetooth devices through the RF transceiver 10.

When the slave Bluetooth devices transmit their IP addresses to the Bluetooth communication device 100 in response to the IP message transmission request data packet, the communication controller 30 of the Bluetooth communication device 100 receives the IP addresses through the RF transceiver 10 in step 211. Finally, in step 213, the communication controller 30 stores the received IP addresses in an IP list of the memory 40.

Figure 4:
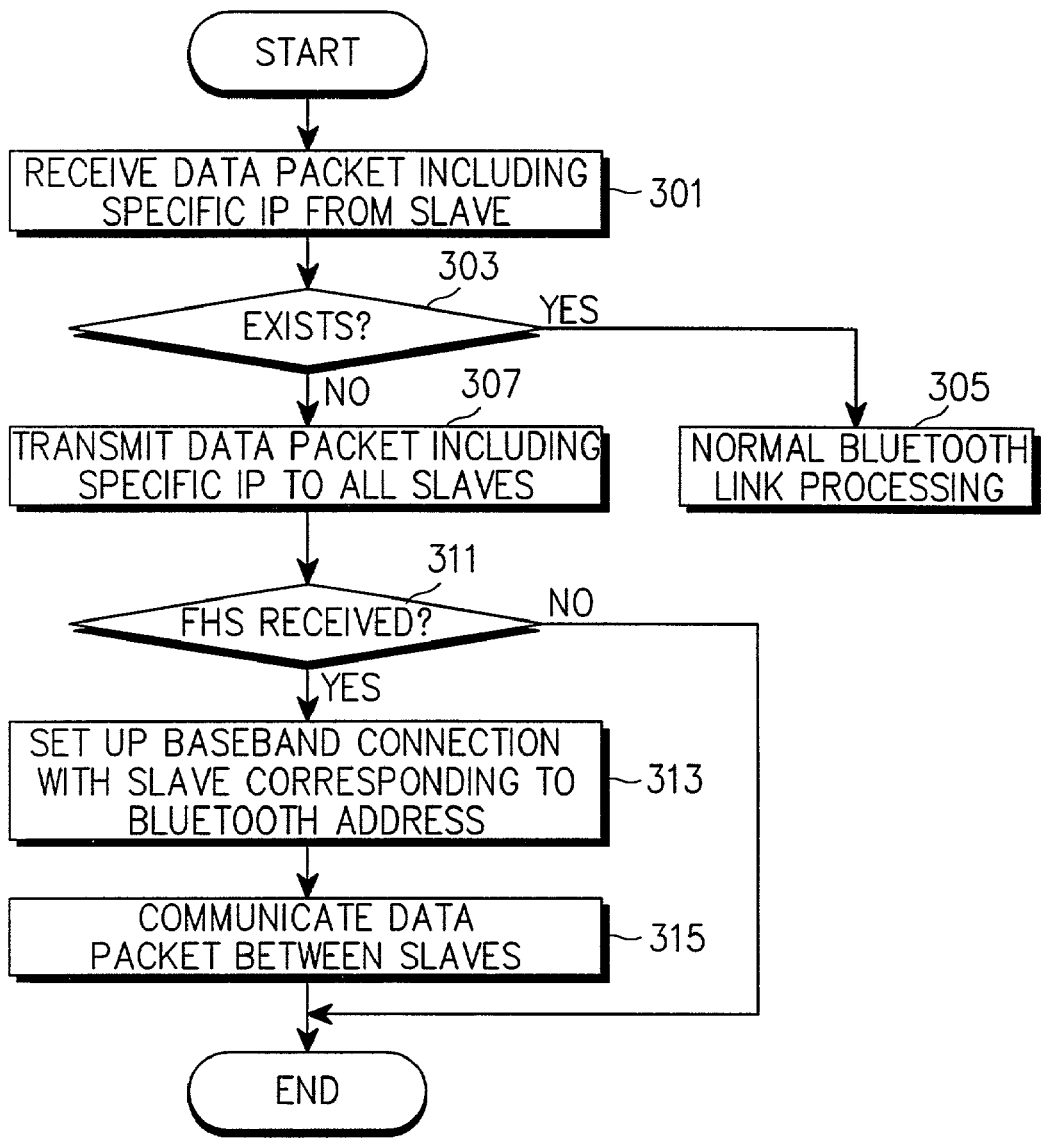
FIG. 4 is a flow chart illustrating a control procedure for connecting, by the Bluetooth communication device, a link between Bluetooth devices that cannot directly communicate with each other, according to an embodiment of the present invention.

FIG. 4 is a flow chart illustrating a control procedure for connecting, by the Bluetooth communication device, a link between Bluetooth devices that cannot directly communicate with each other, according to an embodiment of the present invention. Referring to FIG. 4, the communication controller 30 of the Bluetooth communication device 100 receives a data packet including a specific IP address from a slave Bluetooth device through the RF transceiver 10 in step 301. Here, the specific IP address is used to identify the slave Bluetooth device. In step 303, the communication controller 30 determines whether the received specific IP address is in the IP list of the memory 40.

The communication controller 30 has previously acquired IP addresses of peripheral Bluetooth devices through the aforementioned inquiry function, and retains the IP list (i.e., a set of the acquired IP addresses) in the memory 40. If the specific IP address is in the IP list in step 303, the communication controller 30 proceeds to step 305 to perform a normal Bluetooth link processing operation. Otherwise, if the specific IP address does not exist in the IP list in step 303, the communication controller 30 proceeds to step 307.

In step 307, the communication controller 30 transmits the data packet including the received specific IP address to all the slave devices through the RF transceiver 10. Then, all the slave devices connected to the Bluetooth communication device 100 receive the transmitted data packet including the specific IP address. In general, a Bluetooth device can serve as a slave in one piconet of the scatternet, while serving as a master in another piconet. Therefore, a secondary Bluetooth device serving as a master device among the slave devices having received the specific IP address also has an IP list of slave devices in accordance with the present invention. If the specific IP address is in the IP list of the secondary Bluetooth device, the secondary Bluetooth device transmits a data packet to a slave device corresponding to the specific IP address. Upon receipt of the data packet, the slave device transmits a response packet to the secondary Bluetooth device. Upon receipt of the response packet, the secondary Bluetooth device transmits the received response packet to the Bluetooth communication device 100. In step 311, the communication controller 30 determines whether the Bluetooth communication device 100 has received the transmitted response packet. Here, the response packet is an FHS (Frequency Hopping Selection) packet including a Bluetooth address and clock information of the slave device. Upon failure to receive the response packet in step 311, the communication controller 30 ends the control procedure.

Upon receipt of the response packet in step 311, the communication controller sets up a baseband connection with the slave having transmitted the response packet, in step 313. Then, the communication controller 30 transmits data packets exchanged between slave devices in step 315. Preferably, a data transmission rate is a quarter of a basic data transmission rate proposed by the Bluetooth standard.

When performing normal communication with another Bluetooth device, the communication controller 30 can temporarily stop data communication between Bluetooth devices which it links together, or can reduce a data communication rate between the linked Bluetooth devices to the minimum. That is, when the data communication between the linked Bluetooth devices may cause a problem in normal data communication by the Bluetooth communication device 100, the communication controller 30 transmits a message indicating that it will suspend the link function and a message for requesting the linked Bluetooth devices to retry communication after a lapse of a time required for information exchange, to the linked Bluetooth devices and then suspends the link function.

As described above, the Bluetooth communication system according to the present invention enables a first Bluetooth device not only to communicate with a second Bluetooth device, but also to connect a communication link between the second Bluetooth device and a third Bluetooth device that cannot directly communicate with each other.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for connecting, by a first Bluetooth device in a first piconet, a link between a second Bluetooth device in a second piconet and a third Bluetooth device in a third piconet that cannot directly communicate with each other, the method comprising the steps of:
   upon receiving, by the first Bluetooth device, a connection request message from the second Bluetooth device requesting connection with the third Bluetooth device, transmitting the connection request message from the first Bluetooth device to the third Bluetooth device; and
   upon receiving, by the first Bluetooth device, a response to the connection request message from the third Bluetooth device, transmitting the response from the first Bluetooth device to the second Bluetooth device.

2. A method for connecting, by a Bluetooth communication device having an IP (Internet Protocol) list of a plurality of peripheral Bluetooth devices, a link between a first Bluetooth device and a second Bluetooth device that cannot communicate with each other, the method comprising the steps of:
   receiving an inquiry packet for the second Bluetooth device included in the IP list, from the first Bluetooth device;
   transmitting information about the second Bluetooth device to the first Bluetooth device; and
   upon receiving a request for connection to the second Bluetooth device from the first Bluetooth device, transmitting to the first Bluetooth device a connection permission message permitting connection with the second Bluetooth device and information about the Bluetooth communication device to thereby link the first Bluetooth device to the second Bluetooth device.

3. The method as claimed in claim 2, wherein the first Bluetooth device cannot directly communicate with the second Bluetooth device.

4. The method as claimed in claim 2, wherein a data transmission rate between the first Bluetooth device and the second Bluetooth device is a quarter of a basic data transmission rate of the Bluetooth communication device.

5. The method as claimed in claim 2, wherein the information about the Bluetooth communication device includes clock information and a Bluetooth address.

6. The method as claimed in claim 2, further comprising the steps of:
   periodically transmitting inquiry packets to the peripheral Bluetooth devices;
   upon receiving response packets from the peripheral Bluetooth devices, setting up baseband connections with Bluetooth devices corresponding to Bluetooth addresses relating to the response packets;
   transmitting IP address transmission request data packets to the baseband-connected Bluetooth devices; and
   receiving IP addresses from the baseband-connected Bluetooth devices and storing the received IP addresses in the IP list, thereby acquiring the IP list of the Bluetooth devices.

* * * * *